Oct. 29, 1968                    C. O. GLASGOW                    3,408,097

GASKET RING AND CONDUIT COUPLING

Original Filed Feb. 25, 1963

INVENTOR.
CLARENCE O. GLASGOW

BY

*Dunlap and Laney*
ATTORNEYS

United States Patent Office 3,408,097
Patented Oct. 29, 1968

3,408,097
GASKET RING AND CONDUIT COUPLING
Clarence O. Glasgow, 2620 S. Yorktown,
Tulsa, Okla. 74114
Original application Feb. 25, 1963, Ser. No. 260,369, now Patent No. 3,302,953, dated Feb. 7, 1967. Divided and this application Feb. 3, 1967, Ser. No. 613,824
4 Claims. (Cl. 285—112)

ABSTRACT OF THE DISCLOSURE

A sealing device for use with butt-connected joinder of conduits which consists of an outer, metallic sealing ring having annular, flexible portions extending radially inward and providing high pressure sealing with annular faces of abutting conduit members; and including an inner sealing ring formed of resilient material to be disposed radially inward of the metallic ring and in the groove formed by the tapered inner radial extensions to provide an additional low pressure sealing effect about the conduit joint.

CROSS-REFERENCE TO RELATED APPLICATION

The present application is a division of a copending U.S. application Ser. No. 260,369, now Patent No. 3,302,953, filed on Feb. 25, 1963, in the name of Clarence O. Glasgow and entitled "Improved Gasket Ring and Conduit Coupling."

BACKGROUND OF THE INVENTION

(1) Field of the invention

The present invention relates to pipe couplings and more particularly, but not by way of limitation, it relates to an improved gasket ring for use with bolted flange or union-type couplings and to improved couplings.

(2) Description of the prior art

As is well known in the pipe-fitting art, there are many instances when it is necessary to provide a fluid-tight connection between two joints of pipe or other conduit means after the joints have been installed in such a manner that neither of the conduits can be rotated. In this type of connection, the two joints of pipe are axially aligned with the ends in abutting relationship, and the coupling is positioned around the ends of the stationary sections. Generally speaking, there are three types of couplings used for this type of connection: (a) those which use a peripheral seal around the outside of the pipe, (b) those which use a peripheral seal around the inside of the pipe, and (c) those which provide an annular seal between the abutting ends of the pipe. The present invention is concerned with couplings of the last type which have sealing faces disposed generally normal to the longitudinal axis of the conduits.

These types of couplings are used extensively in refineries, chemical plants and power plants in which a large amount of piping must be fitted into a small space. Much of the piping must carry heated fluids and, accordingly, it is subjected to a relatively high range of temperatures. As a result, it is not uncommon for the pipe couplings to leak after the heat has expanded the fastening means because repeated heating and cooling has loosened the fastening means. The problem is particularly acute around petroleum refineries or other chemical plants handling inflammable material because, in the event of a fire, the pipe joints will quickly be heated to very high temperatures and they will frequently begin to leak as the metallic coupling means expands due to the heat, or as the resilient sealing gaskets sometiems used between the abutting faces are destroyed by the heat.

Even in cases where the couplings will not be subjected to excessive heating or cooling, there are many instances in which it is desirable to safely contain very high pressures. In general, the soft, resilient-type sealing gaskets used in couplings of this type will not withstand high working pressures and are, for this reason, somewhat limited in application. When it is frequently necessary to connect and disconnect a coupling of this type, it has usually been necessary to replace the resilient gasket, if only one is used, each time that the coupling is reconnected. Also, the resilient gaskets are somewhat damaged and the coupling is caused to leak by mechanical loads placed on the coupling; this is particularly true when the loads are imposed at right angles to the joints of pipe causing high compression on one side of the gasket and/or tension on the connecting means on the other side of the coupling.

SUMMARY OF THE INVENTION

The present invention contemplates an improved gasket ring for a coupling having two opposed, annular faces and means for drawing the faces together, the improved gasket ring comprising, in general, a relatively high tensile strength ring having an outer ring portion with a thickness and two inwardly extending, diverging, annular sealing lip portions forming an inwardly facing annular groove between the sealing lip portions, the distance between parts of the annular sealing lip portions being greater than the thickness of the outer ring portion. A resilient sealing ring is preferably disposed between the sealing lip portions such that it substantially fills the annular groove whereby, when the annular faces are drawn together, the annular sealing lip portions will be compressed by the annular faces to form a high pressure seal with the respective annular faces, and the resilient sealing ring will be compressed to form a low pressure seal with the annular faces. The present invention also contemplates an improved union-type coupling utilizing the improved gasket ring, which coupling will hereafter be described in greater detail.

Therefore, it is an important object of the present invention to provide an improved gasket ring for a fluid conduit coupling having two opposed annular faces and means for drawing the faces together.

Another object of the present invention is to provide an improved gasket ring of the type described which will safely withstand much greater pressure than gaskets previously employed.

Yet another object of the present invention is to provide an improved gasket ring of the type described which can be repeatedly used when a coupling is disconnected and connected without adverse effects.

A still further object of the present invention is to provide an improved gasket ring of the type described which will tend not to leak even though the coupling is subjected to substantial temperature changes which cause the means for drawing the faces together to expand and contract.

Yet another object of the present invention is to provide an improved gasket ring of the type described which will continue to hold high pressure even when subjected to high temperatures as might occur during a fire.

Still another object of the present invention is to provide an improved union-type coupling which can be used under greater working pressures, under extreme temperature variations, and under greater mechanical loads without leaking.

Another very important object of the present invention is to provide an improved gasket ring of the type described which is relatively inexpensive to manufacture and has a very long service life.

Many additional objects and advantages of the present invention will be evident to those skilled in the art from the following detailed description when read in conjunction with the accompanying drawings which illustrate the invention.

DESCRIPTION OF THE PREFERRED EMBODIMENT

Figures 1, 2:
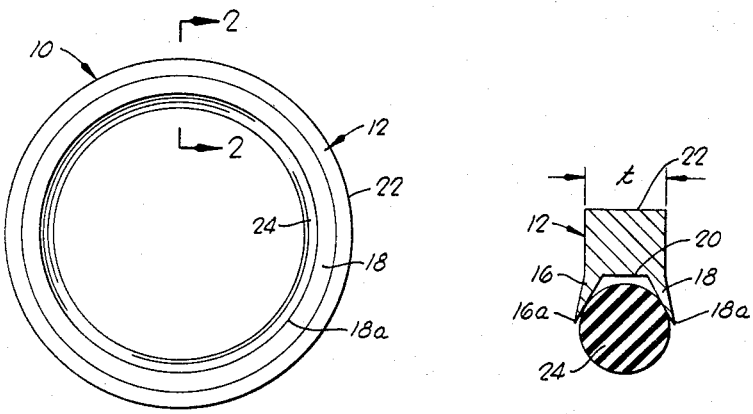
FIG. 1 is a side view of a gasket ring constructed in accordance with the present invention.
FIG. 2 is a sectional view taken substantially on lines 2—2 of FIG. 1.

Referring now to the drawings, and in particular, to FIGS. 1 and 2, a gasket ring constructed in accordance with the present invention is indicated generally by the reference numeral 10. The gasket ring 10 is comprised of an outer ring portion 12 having a longitudinal dimension or thickness $t$, as best seen in FIG. 2, and which is preferably fabricated from a high tensile strength steel. A pair of spring steel sealing lip portions 16 and 18 extend inwardly from the outer ring portion 12 and form an inwardly facing, annular groove 20. The inwardly extending annular lip portions 16 and 18 diverge such that the innermost edges 16a and 18a are spaced apart a distance greater than the thickness $t$ of the outer ring portion 12. Thus it can be noted that the lip portions 16 and 18 together with the outer ring portion 12 are characterized by the fact that the ring portion 12 has a maximum diameter 22 which is sized to be received in a union-type coupling presently to be described.

An annular resilient sealing ring 24 is disposed in the annular groove 20. The sealing ring 24 may conveniently be a standard O-ring having a circular cross section, as illustrated in FIG. 2. It will be noted that the cross sectional diameter of the sealing ring 24 is such as to substantially fill the groove 20. It is important that the sealing ring 24 fill the annular groove 20 when the lip portions 16 and 18 are compressed so that the resilient sealing ring 24 will engage the opposed faces of the coupling presently to be described.

Figures 3, 4:
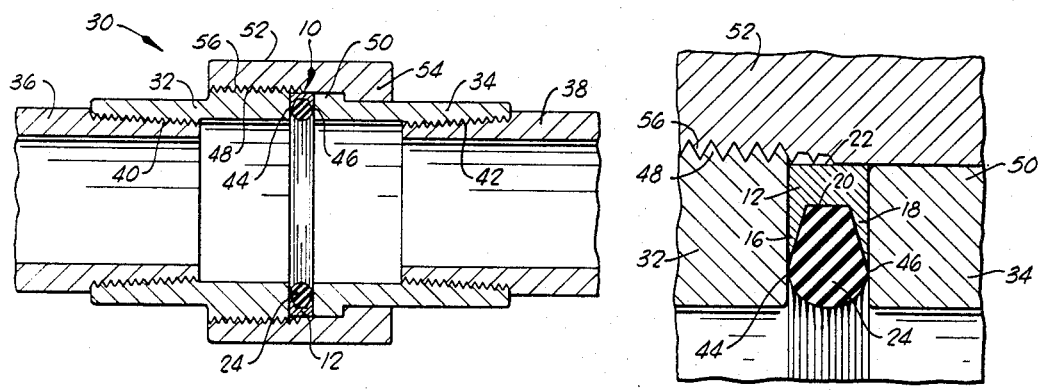
FIG. 3 is a longitudinal sectional view of a novel union-type coupling constructed in accordance with the present invention and utilizing the gasket ring of FIG. 1.
FIG. 4 is an enlarged view of a portion of FIG. 3.

Referring now to FIGS. 3 and 4, a union-type coupling constructed in accordance with the present invention and utilizing a gasket ring 10 is indicated generally by the reference numeral 30. The coupling 30 comprises a pair of tubular coupling members 32 and 34 which are connected to conduits 36 and 38 by internal thread means 40 and 42. The coupling members 32 and 34 have opposed annular faces 44 and 46, as best seen in FIG. 4, which are disposed generally at right angles to the longitudinal axes of the conduits 36 and 38. The coupling member 32 has external thread means 48 adjacent the face 44 and the coupling member 34 has an outwardly extending annular shoulder portion 50 adjacent the annular face 46. A third tubular member 52 has an inwardly directed annular shoulder portion 54 disposed around the smaller diameter of the coupling member 34 and cooperatively engaging the outwardly extending annular shoulder 50 to exert a longitudinal force on the member 34, as will presently be described. The third tubular coupling member 52 also has internal thread means 56 for cooperatively engaging the external thread means 48 on the coupling member 32. Thus it will be evident that when the third coupling member 52 is rotated, the cooperative thread means 48 and 56 will draw the opposed faces 44 and 46 together and compress the gasket ring 10. Of course, the coupling force is transmitted through the cooperating annular shoulders 50 and 54.

When the coupling 30 is tightened by rotation of the third tubular member 52, the faces 44 and 46 will be drawn tightly against the outer ring portion 12 and will thereby press the annular sealing lip portions 16 and 18 together substantially to the position shown in FIG. 4. Of course, the annular sealing lip portions 16 and 18 will press against the faces 44 and 46, respectively, with considerable force due to the strength of the spring steel, and they will thereby form a very tight annular seal. As the sealing lip portions 16 and 18 are pressed together, the annular sealing ring 24 will be compressed and deformed until it completely fills the annular groove 20 and also extends into engagement with the faces 44 and 46. The initial compression of the resilient sealing ring 24 will provide a low pressure seal. Then as the pressure increases, the fluid pressure acting on the convex surface of the sealing ring 24 will press the sealing ring more tightly against the faces 44 and 46, and at the same time will wedge the resilient sealing ring 24 between the lip portions 16 and 18 and thereby press the lip portions more firmly against the faces 44 and 46. When the pressure becomes so great as to normally extrude the resilient rubber sealing ring 24 through any finite opening, i.e., pressures on the order of 10,000 p.s.i., the annular sealing lip portions 16 and 18 will provide a high pressure seal and will prevent any such extrusion of the resilient material forming the sealing ring 24.

From the above detailed description of a preferred embodiment of the present invention, it will be evident that an improved gasket ring has been described. The gasket ring can be used with any type of coupling having, in general, a pair of opposed annular faces and means for drawing the faces together. The gasket ring will effectively hold very high working pressures under adverse conditions of temperature and mechanical loads. The gasket ring is especially useful when used in steam lines or other areas where it will be subjected to large variations in temperatures because expansion of the means for drawing the opposed faces together will not result in a loosening of the gasket ring due to the action of the spring steel sealing lip portions 16 and 18 of the gasket ring 10. The gasket ring can be relatively economically produced and it has a very long life due to the fact that it can be used many times. A preferred coupling utilizing the broad principle of the present invention has also been described. The union-type coupling 30 embodies two annular faces 44 and 46 in combination with the gasket ring 10 and a coupling member 52 to produce a connection which will effectively hold a very high pressure under a wide range of temperatures and which will have a substantially greater mechanical strength than previous flange-type connections utilizing only resilient sealing gaskets.

Although a particular embodiment of the present invention has been described in detail, it is to be understood that various changes, substitutions and alterations can be made therein without departing from the spirit and scope of the invention as defined by the appended claims.

What is claimed is:

1. An improved gasket ring for a conduit coupling having two opposed annular faces and means for drawing the faces together, the gasket ring comprising:

a relatively high tensile strength ring comprising an outer ring portion having a thickness and two radially inwardly extending, diverging, annular sealing lip portions forming a radially inwardly facing annular groove between the sealing lip portions, the distance between the inner ends of the sealing lip portions being greater than the thickness of the outer ring portion; and an annular resilient sealing ring having a generally circular cross section disposed between the sealing lip portions and substantially filling the annular groove, each of said sealing lip portions has a cross-sectional thickness which decreases from the point where said lip portion joins said outer ring portion to the radially inward extent of said lip portion, and the distance between the lip portions at said inward extent is at least as great as the diameter of said annular resilient sealing ring, whereby when the gasket ring is disposed between the annular faces and the faces are drawn together, the annular sealing lip portions will be pressed together by the annular faces and form a high pressure seal therewith, and the resilient sealing ring will contact and seat on the annular faces and form a low pressure seal therewith.

2. An improved gasket ring as set forth in claim 1 which is further characterized in that:

said annular sealing lip portions are each formed to have tapered cross-sectional thickness extending from the outer ring portion inward to terminate as a relatively sharp edge.

3. An improved coupling for interconnecting first and second conduits, comprising:

first and second coupling members each comprising a tubular sleeve having means at one end for connecting the sleeve to one of the conduits and a planar face at the other end disposed generally normal to the longitudinal axis of the tubular sleeve, the planar faces being in facing relationship;

a relatively high tensile strength ring disposed between the planar faces comprising an outer ring portion having a thickness and two inwardly extending, diverging, annular sealing lip portions forming an inwardly facing annular groove between the sealing lip portions, the distance between the lip portions, when in the relaxed condition, being greater than the thickness of the outer ring portion, the sealing lip portions extending into circumferential contact with the faces to establish a high pressure seal between the sealing lip portions and the planar faces;

a resilient sealing ring of substantially circular cross-section disposed between the sealing lip portions and substantially filling the annular groove, the resilient sealing ring being in circumferential sealing engagement with the planar faces to form a low pressure seal between the resilient sealing ring and the planar faces;

each of said sealing lip portions has a cross-sectional thickness which decreases from the point where said lip portion joins said outer ring portion to the radially inward extent of said lip portion, and the distance between the lip portions at said inward extent is at least as great as the diameter of said annular resilient sealing ring, exterior thread means on one of the tubular sleeves adjacent the face thereon;

outwardly extending, annular shoulder means on the other tubular sleeve adjacent the planar face thereof; and a third sleeve member disposed around the exterior thread means, the high tensile strength ring and the outwardly extending annular shoulder means, the third sleeve member having an inwardly extending annular shoulder means for cooperatively engaging the outwardly extending shoulder means and interior thread means for cooperatively engaging the exterior thread means for interconnecting the first and second coupling members and drawing the planar faces together and thereby compressing the lip portions and the resilient sealing ring to form a fluid-tight seal.

4. An improved coupling as set forth in claim 3 which is further characterized in that:

said distance between the tapered sealing lip portions varies from less than the thickness of the outer ring portion adjacent said outer ring portion to greater than said thickness at the innermost radial limits of said lip portions.

References Cited
UNITED STATES PATENTS

| | | | |
|---|---|---|---|
| 2,760,794 | 8/1956 | Hartranft. | |
| 2,211,983 | 8/1940 | Parris | 285—110 |
| 2,646,996 | 7/1953 | Parmesan | 285—354 X |
| 2,775,262 | 12/1956 | Wread | 285—354 X |
| 3,093,581 | 6/1963 | Pall et al. | 277—231 X |
| 3,167,322 | 1/1965 | Aichroth | 277—180 |
| 3,215,442 | 11/1965 | Papenguth | 285—231 X |
| 3,302,953 | 2/1967 | Glasgow | 285—180 |

EDWARD C. ALLEN, *Primary Examiner.*

T. A. CALLAGHAN, *Assistant Examiner.*